2,933,497
BICYCLIC THIAZOLE DERIVATIVES

Raymond M. Dodson, Park Ridge, Ill., assignor to G. D. Searle & Co., Chicago, Ill., a corporation of Delaware No Drawing. Application January 29, 1958
Serial No. 711,810

9 Claims. (Cl. 260—251)

This invention relates to bicyclic thiazole derivatives having the formula

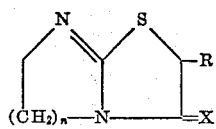

wherein $n$ is 1 or 2, R is a radical selected from the group consisting of phenyl, halogenated phenyl, phenyl(lower)alkyl and cyclohexyl(lower)alkyl, and X is a radical selected from the group consisting of imino and oxo.

The compounds of the invention are prepared by condensing an appropriately substituted 1-cyanoalkanol arylsulfonic acid ester with a cyclic thiourea, followed, if desired, by hydrolysis. The process may be represented as follows wherein R and $n$ have the meanings as aforesaid

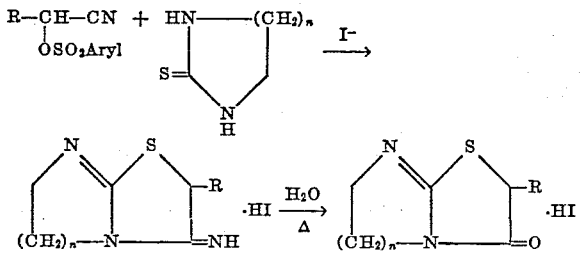

Suitable 1-cyanoalkanol arylsulfonic acid esters are those which contain the structure

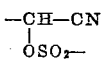

wherein at least one hydrogen is present on the carbon in the α-position relative to the cyano radical and include 1-cyano-phenylalkyl benzenesulfonates such as α-cyanobenzyl benzenesulfonate and nuclearly halogenated derivatives thereof; 1-cyano-2-phenylethyl benzenesulfonate, 1-cyano-3-phenylpropyl benzenesulfonate and nuclearly halogenated derivatives thereof; 1-cyano-(cyclohexyl)alkyl benzensulfonates such as cyano-(cyclohexyl)methyl benzenesulfonate, 1-cyano-3-cyclohexylpropyl benzenesulfonate and the like.

Suitable cyclic thiourea reactants include 2-imidazolidinethione and trimethylene thiourea.

The condensation is carried out preferably at moderate temperatures, such as about room temperature to about 100°, with the use of a metal iodide such as sodium iodide, potassium iodide, calcium iodide, magnesium iodide and the like, which, however, can be omitted in the case of α-cyanobenzyl arylsulfonates and nuclearly halogenated benzyl analogs in which the sulfonic ester group is activated by the presence of both cyano and phenyl groups in α-relation to the ester group.

Suitable solvents for the reaction are preferably nonhydroxylated solvents such as acetone, methyl ethyl ketone, dioxane and the like.

Hydrolysis of the 3-imino radical by heating with water or with aqueous acid, followed by neutralization and separation of the product yields the corresponding 3-oxo analogs.

The condensation of the cyano-[(substituted)-alkyl] benzenesulfonate with the cyclic thiourea reactant yields the reaction product in the form of a salt. The free base is obtained therefrom by treating the salt in aqueous solution with a base such as sodium hydroxide or ammonia, filtering or extracting with a solvent, e.g. methylene dichloride, and collecting the product.

For purposes of this invention the free bases and their pharmaceutically acceptable acid addition salts are equivalent. Any desired such salts are prepared readily from the free base by dissolving the latter in an alcohol such as isopropanol and adding thereto an alcoholic solution of the appropriate acid and recovering the product. Suitable acids for this purpose include the halogen acids such as hydrochloric, hydrobromic or hydriodic, nitric, phosphoric, sulfuric, sulfamic, acetic, lactic, succinic, malic, maleic, tartaric, citric, gluconic, ascorbic or the like.

The compounds of the invention have valuable pharmacological properties. They are potent morphine antagonists and offset the respiratory depression associated with the administration of morphine. They also act as central nervous system depressants at low doses whereas at higher doses they are analeptics. In addition, they potentiate the sleeping time caused by barbiturates.

The invention is described in greater detail in the examples below which are presented by way of illustration and not of limitation. Quantities are expressed in parts by weight and parts by volume which bear the same relation one to the other as kilograms to liters. Temperatures are expressed in degrees centigrade.

Example 1

A suspension of 27.3 parts by weight of α-cyanobenzyl benzenesulfonate, 10.2 parts of weight of 2-imidazolidinethione and 80 parts by volume of acetone is warmed to bring about complete solution, and is then allowed to stand at about 250° C. for 16 hours. The mixture is diluted with water until a persistent turbidity results, and it is then allowed to stand until separation of an insoluble product appears complete. This product is collected on a filter; an additional quantity of the crude product is obtained by dilution of the filtrate with a large volume of water. The combined crude product is recrystallized from ethanol to afford the benzenesulfonic acid salt of 2-phenyl-3-imino-2,3,5,6-tetrahydroimidazo[2.1-b]thiazole melting with decomposition at about 222–224° C. The structural formula of the free base is

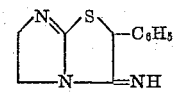

Example 2

A suspension of 27.3 parts by weight of α-cyanobenzyl benzenesulfonate, 10.2 parts by weight of 2-imidazolidinethione and 80 parts by volume of acetone is warmed to bring about complete solution, and is then allowed to stand at about 25° C. for 16 hours. The mixture is diluted with approximately three volumes of water, allowed to stand for an additional 30 minutes, and filtered. The filtrate, chilled to about 0–10° C., is made basic with aqueous ammonia and then, with cooling and stirring, acidified with acetic acid. After an additional 30 minutes, the insoluble product is collected on a filter, washed with water and dried. The product thus obtained is the benzenesulfonic acid salt of 2-phenyl-3-imino-2,3,5,6-tetrahydroimidazo[2.1-b]thiazole, which is the same compound as that obtained by the procedure of Example 1. This preparation melts with decomposition at about 226–229° C.

Example 3

An aqueous suspension of 5 parts by weight of the benzenesulfonic acid salt of 2-phenyl-3-imino-2,3,5,6-tetrahydroimidazo[2.1-b]thiazole in a small quantity of cold water is rendered basic with aqueous ammonia and then, after the addition of ice, made slightly acidic with acetic acid. About 4 parts by weight of solid product is collected on a filter and washed with water. This product is dried and then suspended in 40 parts by volume of methanol. A solution of hydrogen chloride in isopropyl alcohol, having a concentration of about 0.24 gram of hydrogen chloride per milliliter, and containing a total of 1.48 parts by weight of hydrogen chloride, is added, and the mixture is stirred for one hour and then allowed to stand for 24 hours. Ether (80 parts by volume) is added, and the product is collected on a filter and washed with ether. This compound is 2-phenyl-3-imino-2,3,5,6-tetrahydroimidazo[2.1-b]thiazole dihydrochloride. It melts with decomposition at about 222–225° C.

Example 4

A mixture of 8 parts by weight of the benzenesulfonic acid salt of 2-phenyl-3-imino-2,3,5,6-tetrahydroimidazo[2.1-b]thiazole, 100 parts by volume of water and 65 parts by volume of concentrated hydrochloric acid is heated at about 90–100° C. for 2 hours. The cooled reaction mixture is filtered from an insoluble residue, and the filtrate is made basic with 90 parts by volume of concentrated aqueous ammonia. Upon neutralization with acetic acid, a precipitate forms. This product is collected on a filter and washed with water. It is soluble in dilute aqueous ammonia, in dilute hydrochloric acid, and in hot water. Purification by recrystallization from water affords 2-phenyl-3-oxo-2,3,5,6-tetrahydroimidazo[2.1-b]thiazole melting at about 139.5–140.5° C. The structural formula is

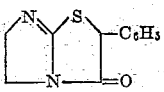

The hydrochloride, prepared by treatment with hydrogen chloride in isopropyl alcohol followed by recrystallization from methanol, melts with decomposition at about 232–234° C.

Example 5

A mixture of 10.26 parts by weight of α-cyano-2,4-dichlorobenzyl benzenesulfonate, 3.06 parts by weight of 2-imidazolidinethione and 45 parts by volume of acetone is heated in order to promote solution of the reactants and initiate separation of the insoluble reaction product. The mixture is then allowed to stand at about 25° C. for 18 hours, after which the insoluble product is collected on a filter and washed with acetone. The product thus obtained melts at about 199–201° C. and is the benzenesulfonic acid salt of 2-(2,4-dichlorophenyl)-3-imino-2,3,5,6-tetrahydroimidazo[2.1-b]thiazole. Upon recrystallization from a mixture of methanol and ether, the melting point is about 202–203° C. The structural formula of the free base is

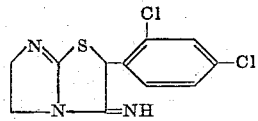

A mixture is prepared from 5 parts by weight of the benzenesulfonic acid salt as described immediately hereinabove, 25 parts by volume of water and 30 parts by volume of concentrated hydrochloric acid. When the reactants are brought together, there occurs partial solution followed by the separation of a precipitate. The mixture is allowed to stand for 30 minutes with external cooling in an ice bath, following which the insoluble product is collected on a filter and washed with ether.

For purification it is resuspended in acetone and again collected on a filter. The compound thus obtained is 2-(2,4-dichlorophenyl)-3-imino-2,3,5,6-tetrahydroimidazo[2.1-b]thiazole hydrochloride which melts to a viscous melt at about 161–162° C.

Example 6

A quantity of the benzenesulfonic acid salt of 2-(2,4-dichlorophenyl)-3-imino-2,3,5,6-tetrahydroimidazo[2.1-b]thiazole is covered with an excess of concentrated aqueous ammonia and stirred. After about five minutes a white, solid product is collected on a filter and washed with water. The wet filter cake is suspended in a small quantity of water, and concentrated hydrochloric acid is added in small portions until the mixture is distinctly acidic and a yellow solution results. This solution is rapidly filtered from a small amount of insoluble residue, and the filtrate is allowed to stand. A white, insoluble product separates within about one hour. Ether is added to facilitate filtration, and the insoluble product is collected on a filter and washed with additional quantities of ether. The product thus obtained is 2-(2,4-dichlorophenyl)-3-oxo-2,3,5,6-tetrahydroimidazo[2.1-b]thiazole hydrochloride which melts with decomposition at about 242–245° C., after prior softening. The structural formula of the free base is

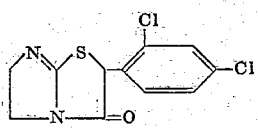

Example 7

A mixture of 15 parts by weight of α-cyano-3,4-dichlorobenzyl benzenesulfonate, 4.5 parts by weight of 2-imidazolidinethione and 64 parts by volume of acetone is warmed and stirred in order to bring about solution of the reactants. The mixture is then maintained at about 25° C. for 20 hours, following which it is concentrated to about one-half of its original volume by vaporization of acetone. Some impure material is precipitated by dilution with anhydrous ether and removed by filtration. The filtrate is brought to dryness by evaporation of the solvents. The residue thus obtained is suspended in an excess of aqueous ammonia, and the mixture is extracted with ether. The ethereal solution is washed with water, rendered anhydrous over sodium sulfate, and filtered. When the ethereal filtrate is treated with hydrogen chloride in isopropyl alcohol, an insoluble product separates. This product is collected, washed with ether, and subjected to further purification by trituration with acetone. The compound is 2-(3,4-dichlorophenyl)-3-oxo-2,3,5,6-tetrahydroimidazo[2.1-b]thiazole hydrochloride which melts with decomposition at about 246–247° C. after prior softening. A more highly purified sample can be prepared by triturating this product with water, collecting it again and washing it with ether. The structural formula of the free base is

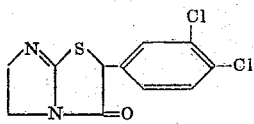

Example 8

To 28.2 parts by weight of o-chlorobenzaldehyde, continuously stirred, and cooled to about 0° C., is added 35.2 parts by weight of benzenesulfonyl chloride. There are then added 20 parts by volume of water and 9.8 parts by weight of sodium cyanide. The exothermic reaction is moderated by the use of efficient cooling so that the temperature of the mixture does not exceed about 35° C., and preferably does not exceed room temperature. An additional 20 parts by volume of water is added, and the mixture is stirred for 3 more hours at about 0–5° C.

The oily product is separated from the aqueous phase and dissolved in a mixture of 32 parts by volume of acetone, 32 parts by volume of ethanol and 15 parts by volume of ether. A small quantity of insoluble residue is removed by filtration, and the filtrate is stirred with 60 parts by weight of ice until precipitation of the oily product is complete. The oily product is separated and rendered anhydrous by filtering it through sodium sulfate. The product obtained amounts to about 70 parts by weight, and is α-cyano-2-chlorobenzyl benzenesulfonate containing a small amount of solvents. It is suitable for use in the following operation without further purification.

A mixture of the 70 parts by weight of crude α-cyano-2-chlorobenzyl benzenesulfonate, as obtained immediately hereinabove, 20.4 parts by weight of 2-imidiazolidinethione and 80 parts by volume of acetone is heated under reflux until substantially complete solution of the reactants is achieved. The mixture is then maintained at about 25° C. for 18 hours. Unreacted 2-imidazolidinethione which can be present is removed by filtration. The filtrate is diluted with water in order to precipitate an oily material. This mixture is refrigerated for 4 hours and washed with ether. The separated aqueous phase is made basic with concentrated aqueous ammonia and extracted with ether. This ethereal extract is dried over sodium sulfate, filtered, chilled and treated with a slight excess of hydrogen chloride in isopropyl alcohol. Crystallization is induced, and the solid product is collected on a filter. For purification, an ethanolic solution is diluted with ether in order to reprecipitate the product. This compound is 2-(o-chlorophenyl)-3-oxo-2,3,5,6-tetrahydroimidazo[2.1-b]thiazole hydrochloride melting at about 217–219° C. The free base, prepared by treating an aqueous solution or suspension of the hydrochloride with an excess of aqueous ammonia, stirring at room temperature for 15 minutes, and crystallizing the insoluble product, melts at about 104–110° C. and has the structural formula

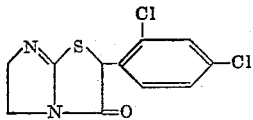

*Example 9*

A slurry of 94 parts by weight of sodium cyanide in 100 parts by volume of water is added to a solution of 67 parts by weight of 3-cyclohexylpropionaldehyde and 86 parts by weight of benzenesulfonyl chloride which has been chilled to 0° C. Following the addition, the temperature rises to 35° C. The thick syrupy mixture is stirred and cooled until it solidifies. The solid is broken up and washed with 1500 parts by volume of water and recrystallized from alcohol-water to yield 1-cyano-3-cyclohexylpropyl benzenesulfonate, melting point 33.5–34° C.

A mixture of 7.7 parts by weight of 1-cyano-3-cyclohexylpropyl benzenesulfonate, 2.9 parts by weight of trimethylenethiourea and 3.75 parts by weight of sodium iodide in 50 parts by volume of acetone is refluxed for one-half hour. The mixture is filtered hot to remove sodium benzenesulfonate and after cooling, 2-cyclohexylethyl-3-imino-2,3,6,7-tetrahydro-5-thiazolo[3.2-a]pyrimidine hydroiodide crystallizes. The solid is recovered and recrystallized from methanol-water; melting point 154–157° C.; infrared maxima at 6.08, 6.22, 6.59, 6.95, 7.32, 7.60, 7.69 and 8.63 microns. The compound has the formula

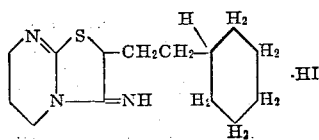

*Example 10*

A solution of 36 parts by weight of benzenepropionaldehyde and 48 parts by weight of benzenesulfonyl chloride is stirred and cooled to 0° C. after which 52 parts by weight of sodium cyanide and 55 parts by volume of water is added in 4 portions. After stirring for an additional hour, the mixture solidifies. The solid is broken up, filtered off and washed with 1000 parts by volume of water to give 1-cyano-3-phenylpropyl benzenesulfonate.

A mixture of 28.9 parts by weight of 1-cyano-3-phenylpropyl benzenesulfonate, 75 parts by volume of acetone and 15 parts by weight of sodium iodide is allowed to stand overnight. The solid precipitate is separated by filtration and washed with 75 parts by volume of acetone. To the filtrate, 5.8 parts by weight of trimethylenethiourea is added and the resulting solution is refluxed for 4 hours and filtered hot. The filtrate is concentrated to 50 parts by volume, cooled and allowed to stand. The precipitate which forms is separated by filtration and recrystallized from a mixture of methanol and methyl ethyl ketone to yield 2-phenylethyl-3-imino-2,3,6,7-tetrahydro-5-thiazolo[3.2-a]pyrimidine hydroiodide; melting point 160–163° C.; infrared absorption maxima at 6.03, 6.17, 6.53, 6.88, 7.22, 8.30 and 8.68 microns. The product has the formula

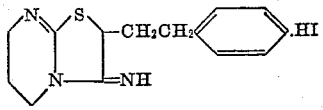

*Example 11*

A solution of 18.4 parts by weight of 1-cyano-3-cyclohexylpropyl benzenesulfonate, 100 parts by volume of acetone and 9 parts by weight of sodium iodide is allowed to stand for 24 hours after which the mixture is filtered and the solid which separates is washed with 25 parts by volume of acetone. To the filtrate is added 6.1 parts by weight of 2-imidazolidinethione; the mixture is heated under reflux for 4 hours, cooled and filtered. The solid is washed with a little acetone which is added to the filtrate. The filtrate is concentrated, the solid which precipitates is recovered, washed with 10 parts by volume of water, triturated with 10 parts by volume of acetone and washed with ether to yield 2-cyclohexylethyl-3-imino-2,3,5,6-tetrahydroimidazo[2.1 - b]thiazole hydroiodide which melts at 200–202° C. and exhibits infrared absorption maxima at 5.92, 6.05, 6.21, 6.88, 7.41, 8.13 and 8.27 microns and has the formula

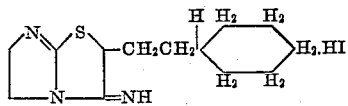

One part by weight of 2-cyclohexylethyl-3-imino-2,3,5,6-tetrahydroimidazo[2.1-b]thiazole hydroiodide is dissolved in water containing a little methanol and an excess of aqueous ammonia added. A precipitate of the free base forms which is recovered and, after air drying, melts at 93.5–96° C. It is dissolved in methanol to which a solution of hydrogen chloride in methanol is added. A precipitate is formed immediately which is the dihydrochloride of 2-cyclohexylethyl-3-imino-2,3,5,6-tetrahydroimidazo-[2.1-b]thiazole; melting point 158–160° C.

*Example 12*

A solution of 2 parts by weight of 2-cyclohexylethyl - 3 - imino - 2,3,5,6 - tetrahydroimidazo[2.1 - b] thiazole hydroiodide in the minimum quantity of methanol is diluted with concentrated aqueous ammonia until a precipitate is obtained. The solid precipitate is recovered and mixed with a methanolic solution of hydrogen chloride. A new solid begins forming before all of the free base has dissolved. The mixture is allowed to stand for one-half hour. The precipitate which forms is recovered, mixed with water, heated, and the aqueous mixture concentrated to one-half volume in vacuo. The solid material which forms is separated by filtration to yield 2-cyclohexylethyl-3-oxo-2,3,5,6-tetrahydroimidazo[2.1-b]thiazole hydrochloride, melting at about 154–157° C., exhibiting absorption maxima in the infrared at 5.73, 5.96, 6.21, 6.72, 6.89, 7.22, 7.40 and 7.87 microns and having the formula

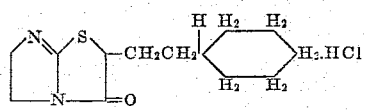

A mixture of 0.1 part by weight of 2-cyclohexylethyl-3-imino-2,3,5,6-tetrahydroimidazo[2.1-b]thiazole dihydrochloride and three parts by volume of water is heated for one-half hour. Concentrated ammonia is added to the clear solution. The aqueous layer is decanted from the oily layer which is dissolved in ether, diluted with petroleum ether and filtered. The filtrate is concentrated in vacuo to yield 2-cyclohexylethyl-3-oxo-2,3,5,6-tetrahydroimidazo[2.1-b]thiazole as an oil which exhibits infrared maxima at 3.36, 3.45, 5.92, 6.12, 6.88, 7.15, 7.43 and 8.05 microns.

Example 13

A solution of 28.9 parts by weight of 1-cyano-3-phenylpropyl benzenesulfonate, 75 parts by volume of acetone and 15 parts by weight of sodium iodide is allowed to stand overnight. The mixture is filtered, the solid washed with 75 parts by volume of acetone and the filtrates combined. To this solution is added 3.9 parts by weight of 2-imidazolidinethione and the resulting solution refluxed for 4 hours. The reaction mixture is filtered and the filtrate concentrated in vacuo to 25 parts by volume. The solid which forms is recovered and is 2-phenylethyl-3-imino-2,3,5,6-tetrahydroimidazo[2.1-b]thiazole hydroiodide which exhibits absorption maxima in the infrared at 5.93, 6.04, 6.21, 6.67, 6.85, 7.41, 7.68, 8.05 and 8.29 microns. The product has the formula

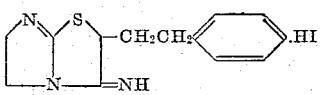

Substitution of an equivalent quantity of 1-cyano-4-phenylbutyl benzenesulfonate (prepared from phenylbutyraldehyde according to the procedures of Example 9) for the 1-cyano-3-phenylpropyl benzenesulfonate and otherwise following the above procedure yields 2-phenylpropyl - 3 - imino - 2,3,5,6 - tetrahydroimidazo[2.1-b]-thiazole hydroiodide.

Example 14

A mixture of 10 parts by weight of 2-phenylethyl-3-imino-2,3,6,7 - tetrahydro - 5 - thiazolo[3.2-a]pyrimidine hydroiodide with 75 parts by volume of water is heated on the steam bath for several hours. After standing overnight, the aqueous layer is decanted, the residue washed with water and then triturated with methanol. The resulting crystals are recovered to yield 2-phenylethyl - 3 - oxo - 2,3,6,7 - tetrahydro - 5 - thiazolo[3.2-a]pyrimidine hydroiodide which melts at 215–225° C., exhibits absorption maxima in the infrared at 5.72, 6.13, 6.58, 6.87, 7.32, 7.47, 7.75, 7.96, and 8.40 microns and has the formula

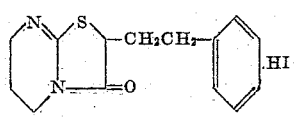

Example 15

A mixture of 10 parts by weight of 2-phenylethyl-3-imino - 2,3,5,6 - tetrahydroimidazo[2.1-b]thiazole hydroiodide and 75 parts by volume of water is heated on the steam bath for several hours. After standing overnight, the aqueous layer is decanted, the residue recovered, washed with water and triturated with methanol. The crystalline residue is recovered to yield 2-phenylethyl-3-oxo-2,3,5,6-tetrahydroimidazo[2.1-b]thiazole hydroiodide exhibiting absorption maxima in the infrared at 5.75, 5.95, 6.2, 6.7, 6.85, 7.2 and 7.4 microns. The product has the formula

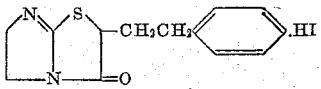

Example 16

A slurry of 94 parts by weight of sodium cyanide in 100 parts by volume of water is added to a solution of 77 parts by weight of 4-cyclohexylbutyraldehyde and 88 parts by weight of benzenesulfonyl chloride which has been chilled to 0° C. Following the addition, the temperature rises to about 35° C. and the thick syrupy mixture is stirred and cooled until it solidifies. The solid is broken up and washed with 1500 parts by volume of water and crystallized from alcohol-water to yield 1-cyano-4-cyclohexylbutyl benzenesulfonate.

A mixture of 8.0 parts of weight of 1-cyano-4-cyclohexylbutyl benzenesulfonate, 2.9 parts by weight of trimethylenethiourea and 3.75 parts by weight of sodium iodide in 50 parts by volume of acetone is refluxed for one-half hour. The mixture is filtered hot to remove sodium benzenesulfonate and, after cooling, 2-cyclohexylpropyl - 3 - imino - 2,3,6,7 - tetrahydro-5-thiazolo[3.2-a]-pyrimidine hydroiodide crystallizes. The solid is recovered and recrystallized from methanol-water, exhibits infrared maxima at 6.1, 6.2, 6.6, 7.3, 8.6 and 9.5 microns and has the formula

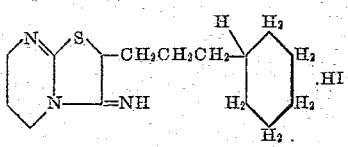

Example 17

A mixture of 53 parts by weight of 2,4-dibromobenzaldehyde and 35 parts by weight of benzenesulfonyl chloride is heated on a steam bath, then stirred and cooled to 0° C. To the mixture is added a solution of 11 parts by weight of sodium cyanide in 30 parts by volume of water. Stirring is continued for 3 hours at 0–5° C. after which time the oily organic layer is separated and washed repeatedly with water to yield crude α-cyano-2,4-dibromobenzyl benzenesulfonate.

A mixture of 12 parts by weight of α-cyano-2,4-dibromobenzyl benzenesulfonate, 3.1 parts by weight of 2-imidazolidinethione and 45 parts by volume of acetone is heated in order to promote solution of the reactants and initiate separation of the insoluble reaction product. The mixture is then allowed to stand at about 25° C. for 18 hours, after which the insoluble product is collected on a filter and washed with acetone. The material is recrystallized from a mixture of methanol and ether to yield the benzenesulfonic acid salt of 2-(2,4-dibromophenyl) - 3 - imino - 2,3,5,6 - tetrahydroimidazo[2.1-b]-thiazole, the free base of which has the formula

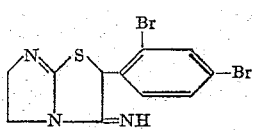

Example 18

A mixture of 31 parts by weight of 4-chlorophenylacetaldehyde and 35 parts by weight of benzenesulfonyl chloride is stirred and cooled to 0° C. To the mixture is added a solution of 11 parts by weight of sodium cyanide in 30 parts by volume of water. Stirring is continued for 3 hours at 0–5° C. after which time the oily organic layer is separated and washed repeatedly with water to yield α-cyano-4-chlorophenylethyl benzenefulfonate. A solution of 10 parts by weight of α-cyano-4-chlorophenylethyl benzenesulfonate, 5 parts by weight of sodium iodide and 50 parts by volume of acetone is allowed to stand at room temperature for 24 hours, filtered and the solid which separates washed with 10 parts by volume of acetone. To the combined filtrate and washing is added 3.1 parts by weight of 2-imidazolidinethione. The resulting mixture is heated under reflux for 4 hours, cooled and filtered. The acetone filtrate is concentrated and the solid which precipitates is recovered, washed with water, triturated with acetone and washed with ether to yield the hydroiodide of 2-(4-chlorobenzyl)-3-imino-2,3,5,6-tetrahydroimidazo [2.1-b]thiazole of the formula

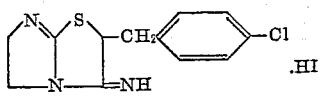

What is claimed is:

1. A compound of the formula

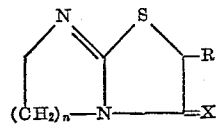

wherein $n$ is selected from the group of numerals consisting of 1 and 2, R is selected from the group of radicals consisting of phenyl, chlorinated phenyl, phenyl (lower)alkyl, chlorinated phenyl(lower)alkyl and cyclohexyl(lower)alkyl, and X is selected from the group of radicals consisting of imino and oxo.

2. 2 - phenyl - 3 - imino - 2,3,5,6 - tetrahydroimidazo-[2.1-b]thiazole.
3. 2 - phenyl - 3 - oxo - 2,3,5,6 - tetrahydroimidazo-[2.1-b]thiazole.
4. 2-(2,4-dichlorophenyl) - 3 - imino - 2,3,5,6-tetrahydroimidazo[2.1-b]thiazole.
5. 2-(2,4-dichlorophenyl)-3-oxo - 2,3,5,6 - tetrahydroimidazo[2.1-b]thiazole.
6. 2-cyclohexylethyl-3-imino - 2,3,6,7 - tetrahydro-5-thiazolo[3.2-a]pyrimidine.
7. 2 - phenylethyl - 3 - imino - 2,3,6,7 - tetrahydro-5-thiazolo[3.2-a]pyrimidine.
8. 2-cyclohexylethyl - 3 - oxo - 2,3,5,6 - tetrahydroimidazo[2.1-b]thiazole.
9. 2-cyclohexylethyl - 3 - imino - 2,3,5,6 - tetrahydroimidazo[2.1-b]thiazole.

References Cited in the file of this patent
UNITED STATES PATENTS 2,527,265   Kendall et al. _____ Oct. 24, 1950

UNITED STATES PATENT OFFICE
CERTIFICATE OF CORRECTION

Patent No. 2,933,497

April 19, 1960

Raymond M. Dodson

It is hereby certified that error appears in the printed specification of the above numbered patent requiring correction and that the said Letters Patent should read as corrected below.

Column 2, line 36, for "parts of weight" read -- parts by weight --; column 5, line 15, for "2-imidiazolidine-" read -- 2-imidazolidine- --; same column 5, lines 39 to 44, the formula should appear as shown below instead of as in the patent:

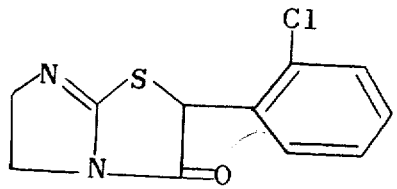

Signed and sealed this 3rd day of January 1961.

(SEAL)
Attest:

KARL H. AXLINE
Attesting Officer

ROBERT C. WATSON
Commissioner of Patents